United States Patent
Leong et al.

(10) Patent No.: US 11,049,264 B2
(45) Date of Patent: Jun. 29, 2021

(54) MARKER DETECTING DEVICE AND OPTICAL TRACKING DEVICE

(71) Applicant: PixArt Imaging Inc., Hsin-Chu (TW)

(72) Inventors: Keen-Hun Leong, Penang (MY); Joon Chok Lee, Penang (MY); Yueh Mei Kim, Penang (MY)

(73) Assignee: PixArt Imaging Inc., Hsin-Chu (TW)

(*) Notice: Subject to any disclaimer, the term of this patent is extended or adjusted under 35 U.S.C. 154(b) by 21 days.

(21) Appl. No.: 16/592,718

(22) Filed: Oct. 3, 2019

(65) Prior Publication Data

US 2021/0104051 A1    Apr. 8, 2021

(51) Int. Cl.
*G06T 7/20* (2017.01)
*H04N 5/232* (2006.01)
*G06T 7/246* (2017.01)
*G06T 7/73* (2017.01)

(52) U.S. Cl.
CPC .......... *G06T 7/248* (2017.01); *G06T 7/74* (2017.01); *H04N 5/23299* (2018.08); *G06T 2207/30204* (2013.01); *G06T 2207/30244* (2013.01)

(58) Field of Classification Search
CPC . G06T 7/248; G06T 7/74; G06T 2207/30204; G06T 2207/30244; H04N 5/23299
See application file for complete search history.

(56) References Cited

U.S. PATENT DOCUMENTS

| | | | |
|---|---|---|---|
| 10,742,902 B2* | 8/2020 | Chen | G06T 7/246 |
| 2005/0234333 A1* | 10/2005 | Takemoto | G06T 7/80 |
| | | | 600/426 |
| 2012/0148103 A1* | 6/2012 | Hampel | G06K 9/00771 |
| | | | 382/103 |
| 2015/0125032 A1* | 5/2015 | Yamanaka | G06K 9/00624 |
| | | | 382/103 |
| 2019/0278098 A1* | 9/2019 | Prest | G06T 19/006 |

* cited by examiner

*Primary Examiner* — Sath V Perungavoor
*Assistant Examiner* — Tyler B Edwards
(74) *Attorney, Agent, or Firm* — Winston Hsu

(57) ABSTRACT

A marker detecting device comprising: an image sensor, comprising a plurality of difference sensing regions; and a processing circuit, configured to determine a marker exists when a first difference of pixel value data of images captured by different ones of the difference sensing regions is larger than a marker difference threshold and to determine the marker does not exist when the first difference is smaller than the marker difference threshold.

8 Claims, 6 Drawing Sheets

MARKER DETECTING DEVICE AND OPTICAL TRACKING DEVICE

BACKGROUND OF THE INVENTION

1. Field of the Invention

The present invention relates to a marker detecting device and an optical tracking device, and particularly relates to a marker detecting device and an optical tracking device which can detect at least one marker while the frame rate thereof is high.

2. Description of the Prior Art

Current technology uses an image sensor and an image processing technique to detect a marker. However, such technique normally doesn't have a motion tracking ability and it relies on the host to implement an independent algorithm for tracking purposes. Also, such marker detecting algorithm and tracking algorithm always could not be used when the image sensor has a high frame rate.

SUMMARY OF THE INVENTION

Therefore, one objective of the present invention is to provide a marker detecting device which can detect mark even if the image sensor has a high frame rate.

Another objective of the present invention is to provide an optical tracking device which can calculate a location of the optical tracking device even if the image sensor has a high frame rate.

One embodiment of the present invention is provides a marker detecting device comprising: an image sensor, comprising a plurality of difference sensing regions; and a processing circuit, configured to determine a marker exists when a first difference of pixel value data of images captured by different ones of the difference sensing regions is larger than a marker difference threshold and to determine the marker does not exist when the first difference is smaller than the marker difference threshold.

Another embodiment of the present invention is provides an optical tracking device, comprising: an image sensor, comprising a plurality of difference sensing regions; and a processing circuit, configured to determine a marker exists when a first difference of pixel value data of images captured by different ones of the difference sensing regions is larger than a marker difference threshold and to determine the marker does not exist when the first difference is smaller than the marker difference threshold; wherein the processing circuit determines a location of the optical tracking device according to marker determination.

In view of the above-mentioned embodiments, the marker can be accurately detected and the location of the optical tracking device can be precisely tracked even when the image sensor has a high frame rate.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Please note, the components in each embodiment can be implemented by hardware (e.g. circuit or device) or firmware (e.g. a processor installed with at least one program). Further, please note the terms "first", "second" . . . and the like in following descriptions are used for identifying different components or different parameters, but do not mean the sequence thereof.

Figure 1:
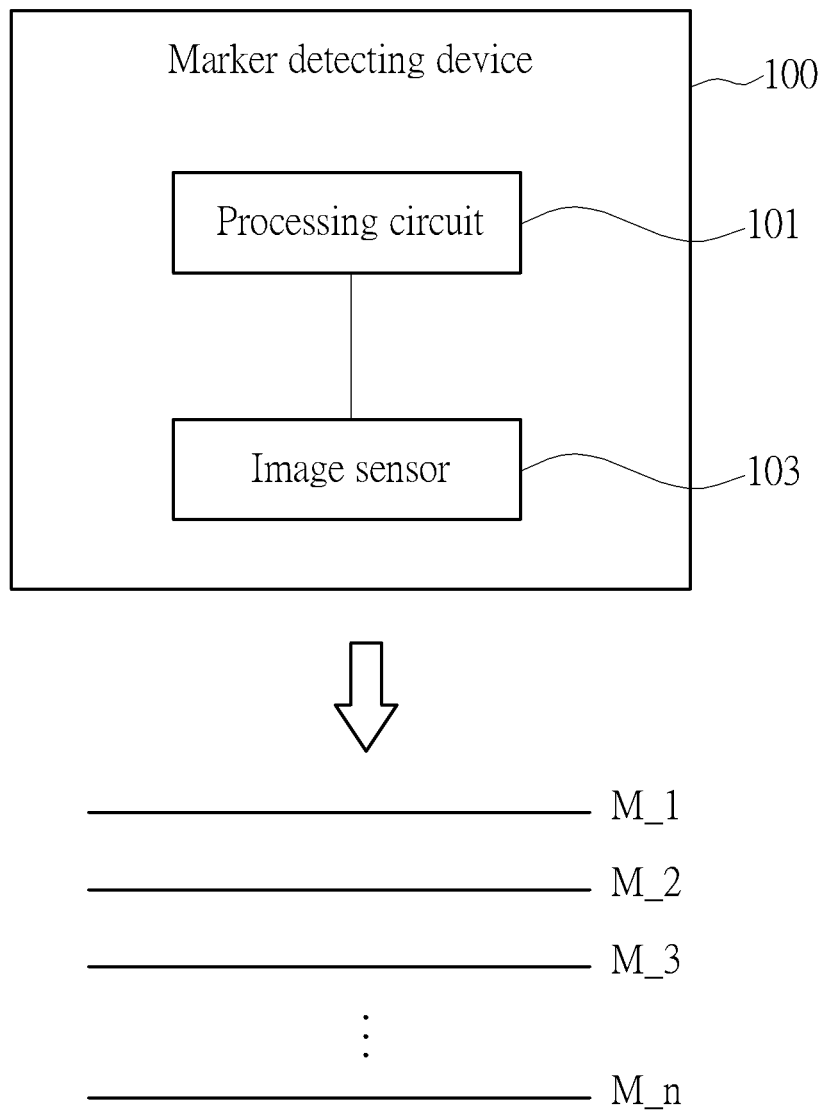
FIG. 1 is a block diagram illustrating a marker detecting device according to one embodiment of the present invention.

FIG. 1 is a block diagram illustrating a marker detecting device 100 according to one embodiment of the present invention. As illustrated in FIG. 1, the marker detecting device 100 comprises a processing circuit 101 and an image sensor 103. The image sensor 103 comprises a plurality of difference sensing regions. The processing circuit 101 is configured to determine whether at least one of the markers $M\_1, M\_2, M\_3 \ldots M\_n$ exists or not according to at least one difference between pixel value data of images captured by different sensing regions. That is, the processing circuit 101 determines whether at least one of the markers $M\_1, M\_2, M\_3 \ldots M\_n$ enters or leaves a range of the image sensor 103 according to a first difference between pixel value data of images captured by different sensing regions. The operations that how the processing circuit 101 determines whether at least one of the markers $M\_1, M\_2, M\_3 \ldots M\_n$ exists or not will be described in following descriptions.

The markers $M\_1, M\_2, M\_3 \ldots M\_n$ can be specially provided on a surface (e.g. provided by laser on a metal surface) or be marks or textures initially on the surface. Also, in following embodiments, the markers $M\_1, M\_2, M\_3 \ldots M\_n$ are strip-shaped, but the markers $M\_1, M\_2, M\_3 \ldots M\_n$ can have any other shape. Further, in following embodiments, the "pixel value data" means an average pixel value of an image. However, the pixel value data can be any other data related with pixel values. For example, the pixel value data can mean a maximum pixel value, a minimum pixel value or a sum of pixel values. Besides, the marker $M\_1$ is taken as an example in following embodiments, but does not mean the concept of the present invention can only be applied to the marker $M\_1$.

Figure 2:
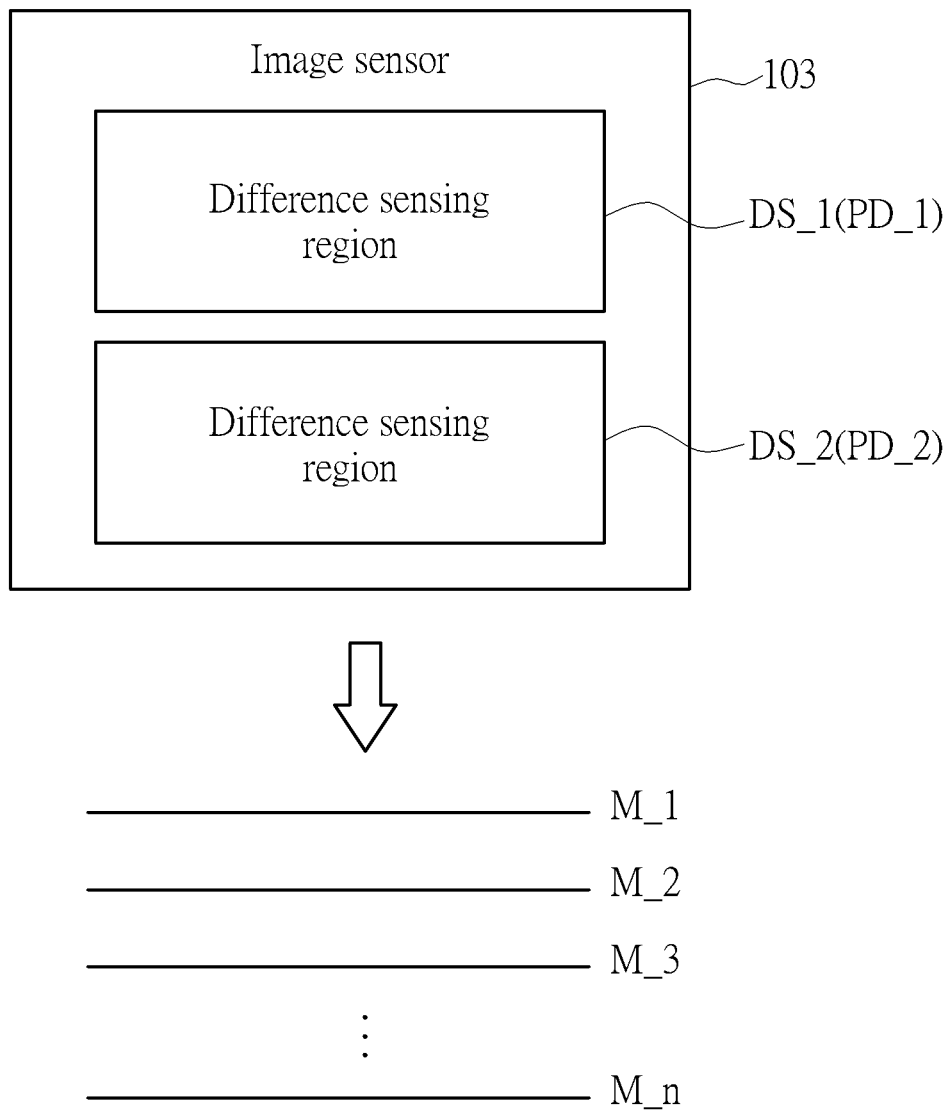
FIG. 2, FIG. 3 and FIG. 4 are block diagrams illustrating image sensors according to different embodiments of the present invention.
Figure 3:
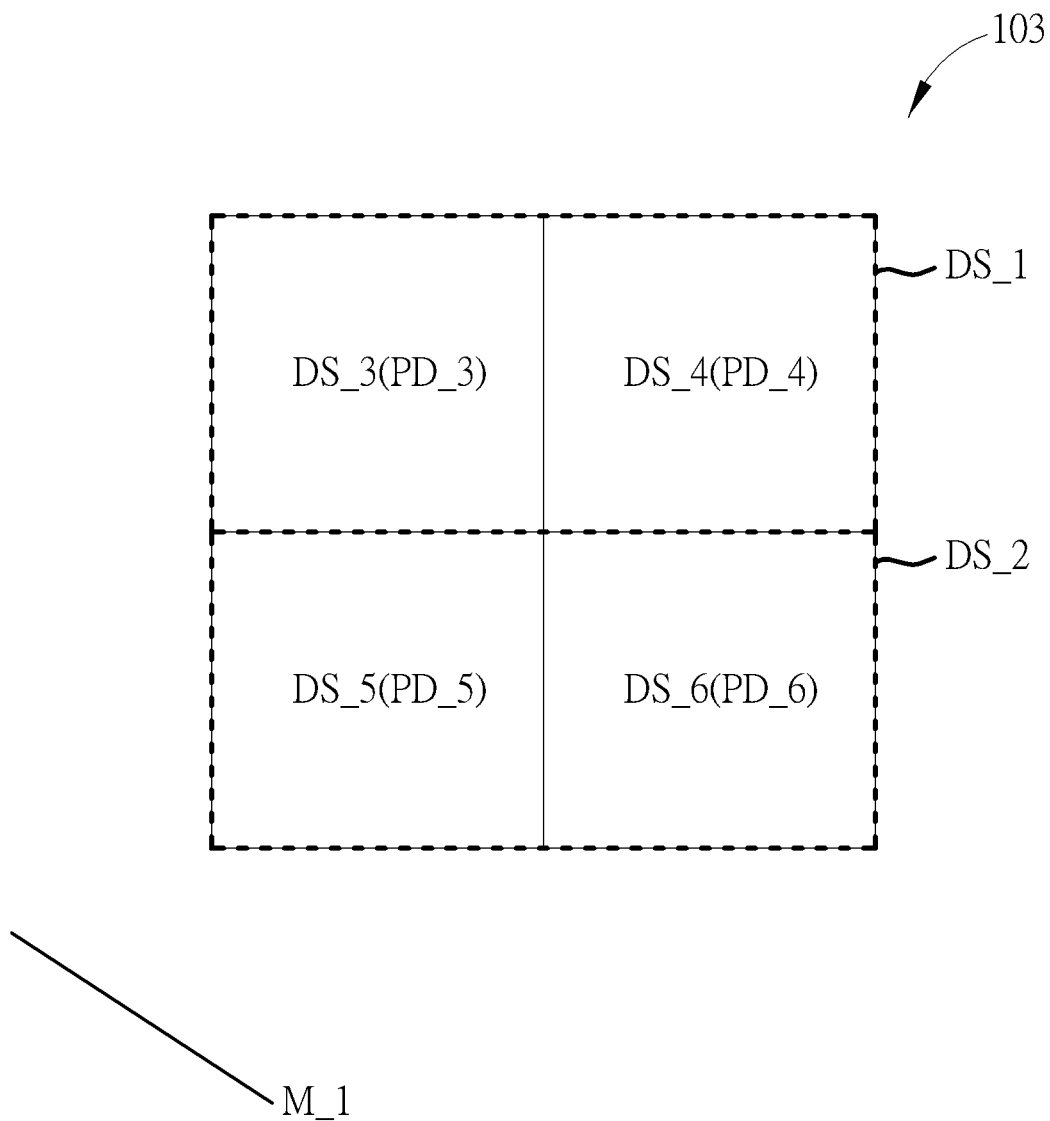
Figure 4:
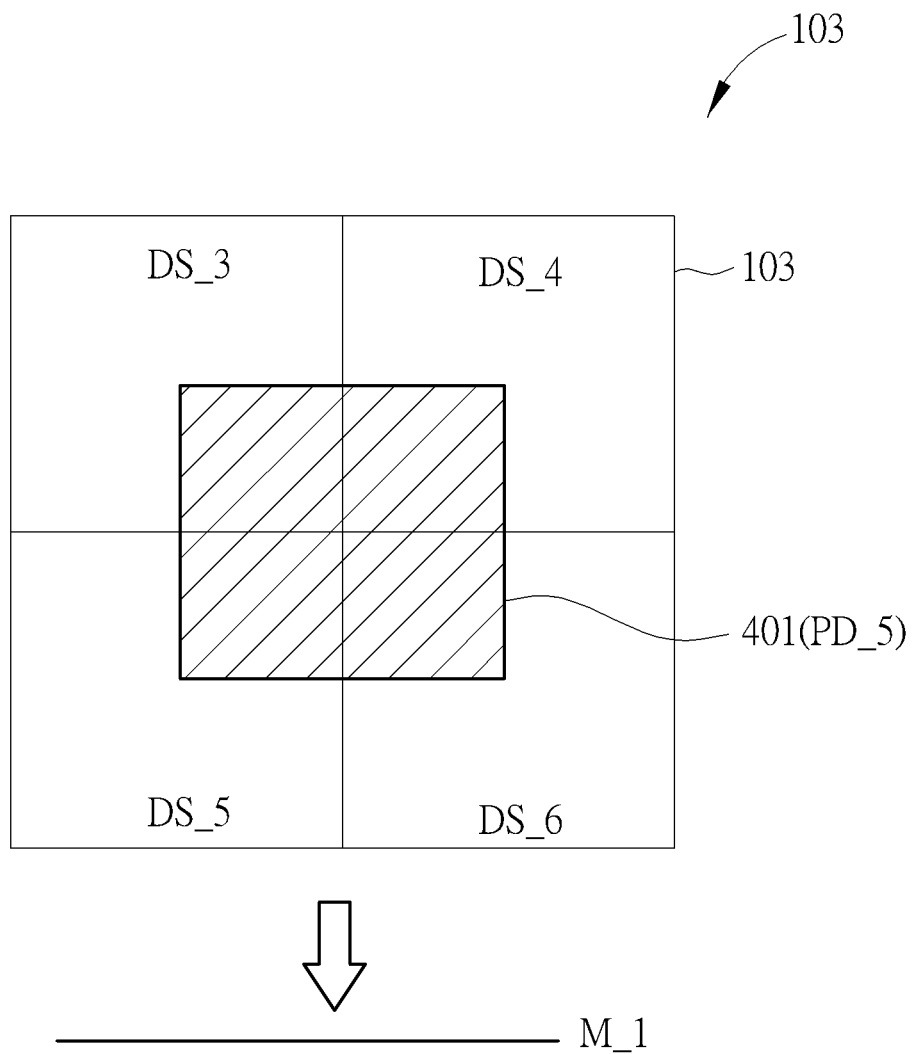

FIG. 2, FIG. 3 and FIG. 4 are block diagrams illustrating image sensors according to different embodiments of the present invention. As illustrated in FIG. 2, the image sensor 103 comprises a first difference sensing region $DS\_1$ and a second difference sensing region $DS\_2$ which are rectangles. In one embodiment, an area of the first difference sensing region $DS\_1$ and an area of the second difference sensing region $DS\_2$ are respectively half of an area of the image sensor 103. Further, the first difference sensing region $DS\_1$ and the second difference sensing region $DS\_2$ can have any other shape or be provided at any other locations.

The marker $M\_1$ has a color apparently different from a surface on which is provided. In following embodiments, the marker $M\_1$ is darker than a surface on which is provided. Therefore, when the marker $M\_1$ enters a range of the first difference sensing region $DS\_1$ or the second difference sensing region $DS\_2$, the marker $M\_1$ changes the pixel value data of the difference sensing region which can capture an image of the marker M_1. Accordingly, the processing circuit 101 in FIG. 1 determines the marker M_1 exists when a second difference of first pixel value data PD_1 of an image captured by the first difference sensing region DS_1 (herein after, named first pixel value data PD_1 of the first difference sensing region DS_1, and other similar descriptions are the same) and second pixel value data PD_2 of an image captured by the second difference sensing region DS_2 is larger than the marker difference threshold and to determine the marker does M_1 not exist when the second difference is smaller than the marker difference threshold.

In one embodiment, when the image sensor 103 moves in a direction from the first difference sensing region DS_1 to the second difference sensing region DS_2 to approach the marker M_1, the processing circuit 101 determines the marker M_1 enters a range of the image sensor 103 when the first pixel value data PD_1 is smaller than the second pixel value data PD_2 for a first marker difference threshold, and determines the marker M_1 will leave the range of the image sensor 103 when the first pixel value data PD_1 is larger than the second pixel value data PD_2 for a second marker difference threshold after the first pixel value data PD_1 is smaller than the second pixel value data PD_2 for the first marker difference threshold. In such case, the image captured by the second difference sensing region DS_2 becomes darker than the image captured by the first difference sensing region DS_1 when the marker M_1 enters the range of the image sensor 103. Further, the image captured by the second difference sensing region DS_2 becomes brighter than the image captured by the first difference sensing region DS_1 when the marker M_1 will leave the range of the image sensor 103. Therefore, the entrance or leaving of the marker M_1 can be determined based on the relations between the first pixel value data PD_1 and the second pixel value data PD_2.

In the embodiment of FIG. 3, the first difference sensing region DS_1 comprises a third difference sensing region DS_3 and a fourth difference sensing region DS_4 which are rectangles. Also, the second difference sensing region DS_2 comprises a fifth difference sensing region DS_5 and a sixth difference sensing region DS_6 which are rectangles. In such embodiment, areas of the third difference sensing region DS_3, the fourth difference sensing region DS_4, the fifth difference sensing region DS_5 and the sixth difference sensing region DS_6 are rectangles and are respectively one quarter of an area of the image sensor 103. Therefore, in such embodiment the area of the first difference sensing region DS_1 and the area of the second difference sensing region DS_2 are respectively half of the area of the image sensor 103.

Via separating the first difference sensing region DS_1 and the area of the second difference sensing region DS_2 to smaller regions, a range of the possible location of the marker M_1 can be extended. For example, as illustrated in FIG. 3, the marker M_1 is provided near the fifth difference sensing region DS_5. Accordingly, the processing circuit 101 can determine the marker M_1 enters the fifth difference sensing region DS_5 if a difference between the fifth pixel value data PD_5 and at least one of the third pixel value data PD_3, the fourth pixel value data PD_4 and the sixth pixel value data PD_6 is larger than a marker difference threshold.

Please note, the sizes and the locations of the difference sensing regions and the shape, the location of the marker are not limited to the embodiments illustrated in FIG. 2 and FIG. 3. Persons skilled in the art can vary the embodiments illustrated in FIG. 2 and FIG. 3 corresponding to different requirements. Such variations should also fall in the scope of the present invention.

In the embodiment of FIG. 4, the image sensor 103 further comprises a pixel value sensing region 401 besides the third difference sensing region DS_3, the fourth difference sensing region DS_4, the fifth difference sensing region DS_5 and the sixth difference sensing region DS_6 illustrated in FIG. 3. In the embodiment of FIG. 4, the pixel value sensing region 401 is located at a center of the image sensor 103. In other words, the third difference sensing region DS_3, the fourth difference sensing region DS_4, the fifth difference sensing region DS_5 respectively overlaps by one quarter of the pixel value sensing region 401. However, the pixel value sensing region 401 can be provided at any location of the image sensor 103 on the premise that the same function is achieved.

In the embodiment of FIG. 4, the processing circuit 101 calculates fifth pixel value data PD_5 of an image captured by the pixel value sensing region 401. The processing circuit 101 determines the marker exists in the range of the pixel value sensing region 401 when the above-mentioned first difference between pixel value data of images captured by different sensing regions is smaller than the marker difference threshold and the fifth pixel value data PD_5 is smaller than a marker value threshold and to determine the marker does not exist in the range of the pixel value sensing region 401 when the first difference is larger than the marker difference threshold and the fifth pixel value data is larger than the marker value threshold.

The pixel value data of the pixel value sensing region 401 decreases when the mark M_1 enters a range of the pixel value sensing region 401. Accordingly, the processing circuit 101 can determine if the marker exist in the range of the pixel value sensing region 401. according whether the fifth pixel value data PD_5 is larger than the marker value threshold or not and the above-mentioned first difference. Please note, the embodiment in FIG. 4 uses the third difference sensing region DS_3, the fourth difference sensing region DS_4, the fifth difference sensing region DS_5 and the sixth difference sensing region DS_6 in FIG. 3 as examples for illustrating. However, other arrangements of the difference sensing regions can be used while the image sensor 103 comprises the pixel value sensing region 401.

Figure 5:
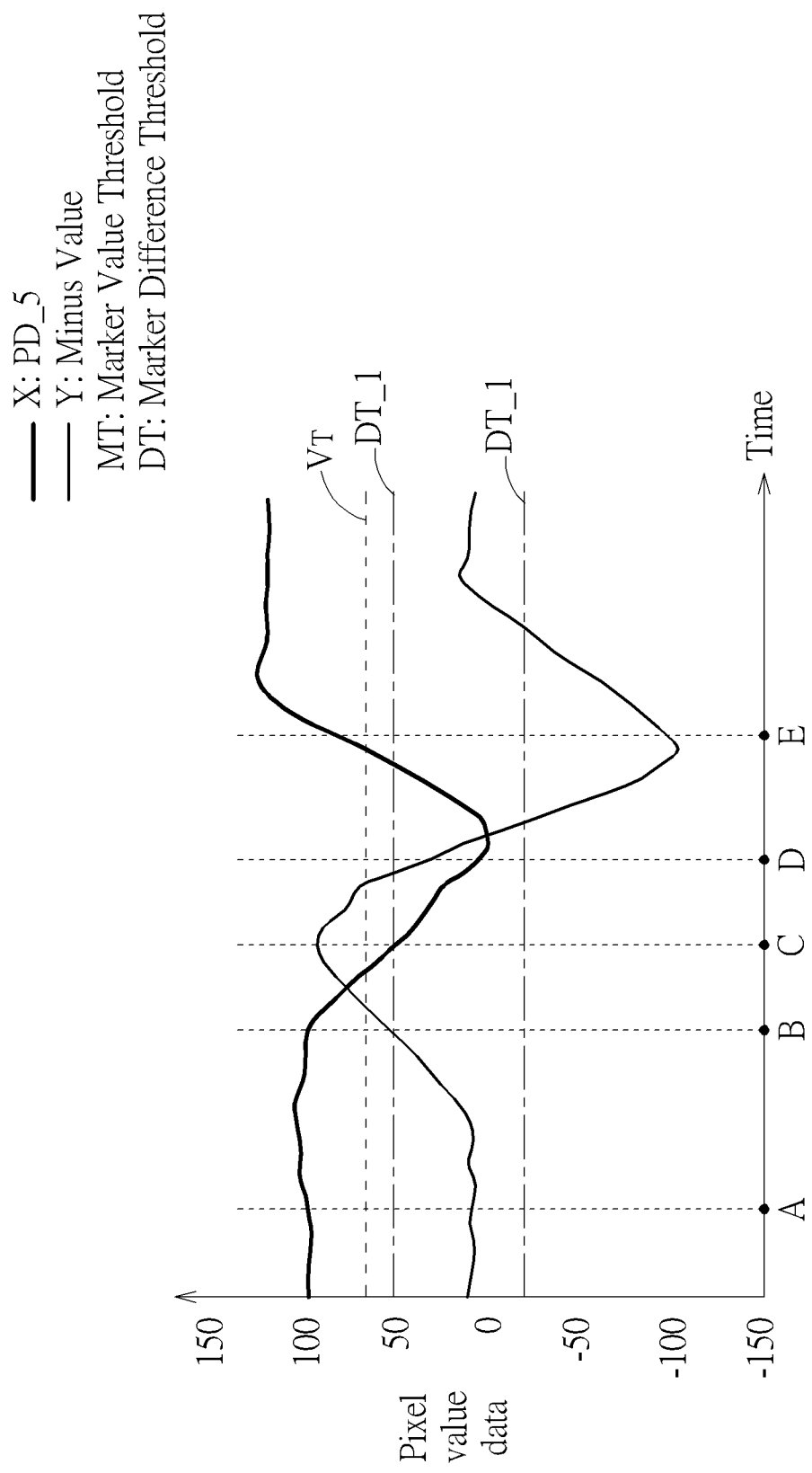
FIG. 5 and FIG. 6 are schematic diagrams illustrating operations of the image sensor in the embodiment of FIG. 4.
Figure 6:
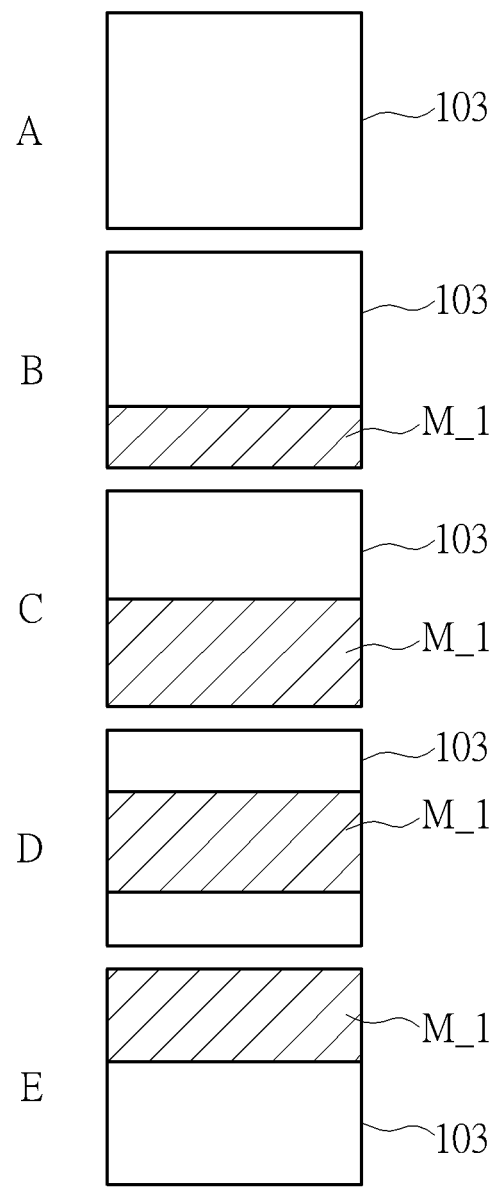

FIG. 5 and FIG. 6 are schematic diagrams illustrating operations of the image sensor in the embodiment of FIG. 4. Please refer to FIG. 4, FIG. 5 and FIG. 6 together to understand the operation of the operations of the image sensor in the embodiment of FIG. 4. In FIG. 5, the curve X means the fifth pixel value data PD_5 of the pixel value sensing region 401. Further, the curve Y in FIG. 5 means a minus value that the pixel value data of the third difference sensing region DS_3 and the fourth difference sensing region DS_4 minus the pixel value data of the fifth difference sensing region DS_5 and the sixth difference sensing region DS_6. At time A, the marker M_1 does not enter the range of the image sensor 103, thus the fifth pixel value data PD_5 is high and the minus value is low. At time B, the marker M_1 enters the bottom of the image sensor 103 and only a small part of marker M_1 enters the pixel value sensing region 401, thus the fifth pixel value data PD_5 is still larger than the marker value threshold VT and the minus value becomes larger than the marker difference threshold DT_1. Thus the processing circuit 101 can determine the marker enters a bottom of the image sensor 103 at the time B.

Also, at time C, the marker M_1 enters all the ranges of the fifth difference sensing region DS_5 and the sixth difference sensing region DS_6 thus a large part of the marker M_1 enters the range of the pixel value sensing region 401. Accordingly, the minus value approaches maximum and the fifth pixel value data PD_5 becomes smaller than the marker value threshold MT. Further, at time D, the marker M_1 totally enters the range of the pixel value sensing region 401, thus the fifth pixel value data PD_5 approaches minimum and the minus value decreases. Additionally, at time E, the marker M_1 enters the range of the third difference sensing region DS_3 and the fourth difference sensing region DS_3 and a part of the marker M_1 leaves the pixel value sensing region 401, thus the fifth pixel value data PD_5 becomes larger than the marker value threshold VT again and the minus value decreases. In the case of time E, the processing circuit 101 can determine that the marker M_1 will leave the range of the image sensor 103.

Therefore, in view of the example of FIG. 5, the processing circuit 101 can determine a location of the marker M_1 based on the fifth pixel value data PD_5 of the pixel value sensing region 401 and/or a minus value that the pixel value data of the third difference sensing region DS_3 and the fourth difference sensing region DS_4 (i.e. the upper half of the image sensor 103) minus the pixel value data of the fifth difference sensing region DS_5 and the sixth difference sensing region DS_6 (i.e. the lower half of the image sensor 103).

The above-mentioned embodiments can be applied to an optical tracking device, such as an optical mouse or similar device, to determine the location of optical tracking device according to marker determination. After determining the marker enters the range of image sensor 103 or leaves the image sensor 103, the processing circuit 103 can further determine a location of the optical tracking device. Take FIG. 1 for example, when a marker M_1 enters the range of the image sensor 103 for the first time, the processing circuit 101 can determine that the optical tracking device is at a location of the maker M_1. Also, if the processing circuit 101 determines a marker enter the range of the image sensor 103 and another marker leaves for the first time, the processing circuit 101 can determine that the optical tracking device is at a location of the maker M_2. Following the same rules, the processing circuit 103 can accurately determine the location of the optical tracking device based on the detection of the markers M_1-M_n even if the image sensor 103 has a high frame rate.

In view of the above-mentioned embodiments, the marker can be accurately detected and the location of the optical tracking device can be precisely tracked even when the image sensor has a high frame rate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A marker detecting device, comprising:
an image sensor, comprising a plurality of difference sensing regions; and
a processing circuit, configured to determine a marker exists when a first difference of pixel value data of images captured by different ones of the difference sensing regions is larger than a marker difference threshold and to determine the marker does not exist when the first difference is smaller than the marker difference threshold;
wherein the difference sensing regions comprises a first difference sensing region and a second difference sensing region;
wherein the processing circuit determines the marker exists when a second difference of first pixel value data of an image captured by the first difference sensing region and second pixel value data of an image captured by the second difference sensing region is larger than the marker difference threshold and to determine the marker does not exist when the second difference is smaller than the marker difference threshold.

2. The marker detecting device of claim 1, wherein an area of the first difference sensing region and an area of the second difference sensing region are respectively half of an area of the image sensor.

3. The marker detecting device of claim 1, wherein when the marker detecting device moves in a direction from the first difference sensing region to the second difference sensing region to approach the marker, the processing circuit determines the marker enters a range of the image sensor when the first pixel value data is smaller than the second pixel value data for a first marker difference threshold, and determines the marker will leave the range of the image sensor when the first pixel value data is larger than the second pixel value data for a second marker difference threshold after the first pixel value data is smaller than the second pixel value data for the first marker difference threshold.

4. The marker detecting device of claim 1, wherein the marker is strip-shaped.

5. An optical tracking device, comprising:
an image sensor, comprising a plurality of difference sensing regions; and
a processing circuit, configured to determine a marker exists when a first difference of pixel value data of images captured by different ones of the difference sensing regions is larger than a marker difference threshold and to determine the marker does not exist when the first difference is smaller than the marker difference threshold;
wherein the processing circuit determines a location of the optical tracking device according to marker determination;
wherein the difference sensing regions comprises a first difference sensing region and a second difference sensing region;
wherein the processing circuit determines the marker exists when a second difference of first pixel value data of an image captured by the first difference sensing region and second pixel value data of an image captured by the second difference sensing region is larger than the marker difference threshold and to determine the marker does not exist when the second difference is smaller than the marker difference threshold.

6. The optical tracking device of claim 5, wherein an area of the first difference sensing region and an area of the second difference sensing region are respectively half of an area of the image sensor.

7. The optical tracking device of claim 5, wherein when the optical tracking device moves in a direction from the first difference sensing region to the second difference sensing region to approach the marker, the processing circuit determines the marker enters a range of the image sensor when the first pixel value data is smaller than the second pixel value data for a first marker difference threshold, and determines the marker will leave the range of the image sensor when the first pixel value data is larger than the second pixel value data for a second marker difference threshold after the first pixel value data is smaller than the second pixel value data for the first marker difference threshold.

8. The optical tracking device of claim 5, wherein the marker is strip-shaped.

* * * * *